Patented July 27, 1926.

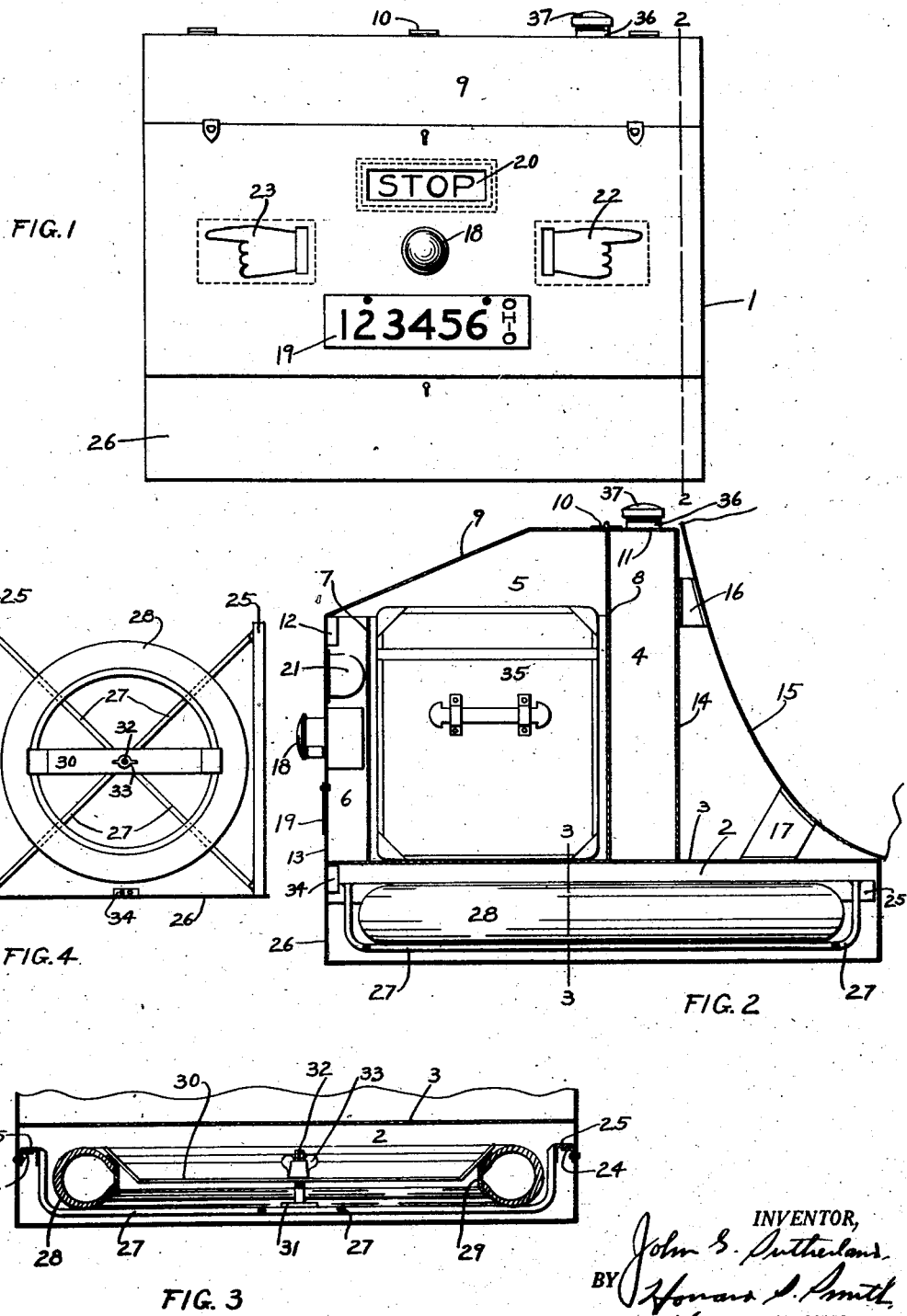

1,593,920

UNITED STATES PATENT OFFICE.

JOHN G. SUTHERLAND, OF OAKWOOD, OHIO.

COMBINATION TIRE AND TRUNK CARRIER.

Application filed June 2, 1923. Serial No. 643,123.

It is the principal object of my invention to provide a simple, compact and attractive tire and trunk carrier in which provision is made for enclosing a liquid fuel tank or other container and electric lamps which illuminate various signs and signals on the face of the carrier.

Facility in placing a trunk or other luggage, and a tire, rim or wheel in the carrier, and in removing them therefrom, as well as freedom from contact with dirt, oil and grease when doing this work, constitute another purpose of the invention.

In its provision for enclosing a trunk, a tire and a liquid fuel tank, my carrier conserves space, which is one of the most important problems of the automotive engineer. It also reduces to an easy and clean operation, the task of placing a tire, rim or wheel in it, and of removing from it the tire, rim or wheel which it contains.

Other important and incidental objects will be brought out in the following specification, and particularly set forth in the subjoined claims.

In the accompanying drawings, Figure 1 is a rear elevation of my improved carrier. Figure 2 is a sectional side view thereof taken on the line 2—2 of Figure 1. Figure 3 is a cross sectional view thereof taken on the line 3—3 of Figure 2, showing the tire carrier portion of the structure. And Figure 4 is a plan view of the tire carrier itself.

Throughout the specification and drawings similar reference characters denote corresponding parts.

In the accompanying drawings illustrating one form of embodiment of my invention, the numeral 1 designates a carrier casing which is preferably constructed of sheet metal and having an elongated, bottom, tire-receiving compartment 2. The top 3 of the compartment 2 forms the bottom for a liquid fuel receiving compartment 4, a trunk receiving compartment 5 and a light-containing compartment 6.

The trunk receiving space or compartment 5 is that defined between front and rear vertical partitions 7 and 8 and the side walls of the casing, and is closed by a cover 9 having a front inclined portion and a rear horizontal part that is secured by hinges 10 to the top 11 of the liquid fuel compartment 4. (See Figures 1 and 2.) By means of a lock 12 the cover 9 may be locked at its front end to the upper portion of the front panel 13 of the casing. The rear panel 14 of the latter, and the bottom compartment 2 thereof, are secured to the body 15 of an automobile by brackets 16 and 17 respectively.

A central tail lamp 18 is carried by the panel 13, to which, below said lamp, there is secured a license plate 19. Above the lamp 18 the panel 13 contains a horizontal opening through which there is displayed the word. Stop on a transparent plate 20 which is illumined by an electric lamp 21. (See Figure 1.)

On each side of the lamp 18 the panel 13 contains a horizontal opening through which there is displayed the representation of a human hand on a transparent plate. The hand 22 which points to the right, is illumined by a lamp (not shown) when the driver of the automobile desires to turn to the right, and the hand 23 which points to the left, is illumined by a lamp (not shown) when the driver of the machine seeks to turn to the left.

Secured to the interior portions of the side walls of the compartment 2, are two longitudinally disposed angle-irons 24, 24 which act as rails upon which slide two angle members 25, 25 which are secured to a panel 26 at their front ends. To the angle members 25, 25 there are secured two U-shaped diagonal rods 27, 27 which cross each other at their middle portions to serve as a support for a tire 28, or for a rim or wheel. (See Figures 2, 3 and 4.) In the drawings the tire 28 is shown mounted on a demountable rim 29 which is engaged by a clamping member 30 to firmly hold the tire on the rods 27, 27 and to prevent it from rattling. Secured to the middle portions of these rods is the flanged base 31 of a bolt 32 which projects upwardly through a central hole in the clamping member 30, receiving on its top end a wing nut 33 by which the tension of the clamping member against the tire rim 29 may be adjusted.

The tire-receiving structure thus defined may be drawn out of the casing like a drawer to permit an automobile tire and rim, or an automobile wheel, to be easily placed upon the U-shaped supporting rods 27, 27 and the clamping member 30 to be applied to it. The carrier may then be easily pushed into the compartment 2 of the casing, after which, by means of a lock 34 which it carries, the panel 26 secured to the rods may be firmly locked to the top 3 of said compartment. When it is desired to change a tire, the carrier may be easily unlocked and drawn out, after which the wing nut 33 and clamping member 30 may be removed to permit the tire and rim within the carrier to be easily lifted out. The operation of inserting a tire in, or removing it from, the carrier is thus a convenient and a clean one.

Not only may a tire and rim, or an automobile wheel be inserted in the carrier, but a trunk 35 or other luggage may be placed within its compartment 5 after the cover 9 has been unlocked and raised. Figure 2 shows a trunk 35 within the compartment 5 under the cover 9 after the latter has been securely locked.

Into the compartment 4 defined between the side walls of the casing and the partition 8 and rear panel 14, gasoline or other liquid fuel may be poured through a nipple 36 secured in the top 11 of said compartment and closed by a cap 37. (See Figures 1 and 2.) The compartment 4 may be made large enough to serve as the main gasoline tank, or as an auxiliary one if desired.

It will now be seen that my improved carrier in providing space for a trunk, a tire or a gasoline tank, as well as for the lamps which illuminate the signals on its rear panel, conserves space, facilitates the insertion and removal of luggage and tires, and presents to the eye a simple, compact and attractive unit.

Having described my invention, I claim:—

1. A carrier of the type described, comprising a casing, a horizontal tire receiving compartment in the bottom of said casing, a top for said tire receiving compartment, and partitions mounted upon the top of said tire receiving compartment and extending between the sides of the casing to provide a luggage receiving space and a fuel receiving space.

2. A carrier of the type described, comprising a casing formed with front and rear partitions to provide a luggage-receiving space, and having a panel behind the rear partition and extending between the sides of the casing to provide a liquid-fuel receiving space, a common bottom for the luggage and fuel receiving compartments, and a horizontal tire receiving compartment below the luggage and fuel receiving compartments having as its top the common bottom of the latter.

3. A carrier of the type described, comprising a casing having a horizontally-disposed tire-receiving compartment, rails mounted in the latter in the direction of its length, slides movable over said rails, diagonal U-shaped tire-supporting rods secured to said slides, a guide projecting upwardly from the middle portions of said rods, and a clamping member on said guide for engagement with the rim of the tire supported by the rods.

In testimony whereof I have hereunto set my hand this 1st day of June, 1923.

JOHN G. SUTHERLAND.